United States Patent
Mortimore, Jr. et al.

(10) Patent No.: US 10,552,849 B2
(45) Date of Patent: Feb. 4, 2020

(54) SYSTEM AND METHOD FOR OFFERING, TRACKING AND PROMOTING LOYALTY REWARDS

(75) Inventors: William Charles Mortimore, Jr., San Francisco, CA (US); Gautam Aggarwal, Philadelphia, PA (US); Jeffrey Low, Portola Valley, CA (US)

(73) Assignee: Deem, Inc., San Francisco, CA (US)

( * ) Notice: Subject to any disclaimer, the term of this patent is extended or adjusted under 35 U.S.C. 154(b) by 801 days.

(21) Appl. No.: 12/771,919

(22) Filed: Apr. 30, 2010
(Under 37 CFR 1.47)

(65) Prior Publication Data

US 2011/0004497 A1    Jan. 6, 2011

Related U.S. Application Data

(60) Provisional application No. 61/174,445, filed on Apr. 30, 2009.

(51) Int. Cl.
   *G06Q 10/00* (2012.01)
   *G06Q 30/02* (2012.01)

(52) U.S. Cl.
   CPC .................... *G06Q 30/02* (2013.01)

(58) Field of Classification Search
   USPC .......................................... 705/5
   See application file for complete search history.

(56) References Cited

U.S. PATENT DOCUMENTS

| | | | |
|---|---|---|---|
| 4,812,843 A | 3/1989 | Champion et al. | |
| 4,969,136 A | 11/1990 | Chamberlin et al. | |
| 5,237,499 A | 8/1993 | Garback | |
| 5,289,531 A | 2/1994 | Levine | |
| 5,404,291 A | 4/1995 | Kerr et al. | |
| 5,422,816 A | 6/1995 | Sprague et al. | |

(Continued)

FOREIGN PATENT DOCUMENTS

| | | |
|---|---|---|
| JP | 2002334115 | 11/2002 |
| JP | 2004334409 | 11/2004 |

OTHER PUBLICATIONS

Alag, Satnam et al., U.S. Appl. No. 11/067,537, entitled "Platform for Multi-service Procurement," filed Feb. 24, 2005.

(Continued)

*Primary Examiner* — Tonya Joseph
(74) *Attorney, Agent, or Firm* — Greenberg Traurig, LLP (57) ABSTRACT

Data to define a travel rewards promotion is received over a network. The travel rewards promotion comprises traveler eligibility criteria and travel rewards criteria. At least one traveler is selected where the travel itinerary of the respective traveler matches traveler eligibility criteria for the promotion. The traveler is notified that he or she is eligible for the travel rewards promotion, the notification comprising a representation of the travel rewards criteria. A travel rewards promotion total is then compiled for the traveler and the traveler is notified of his or her respective promotion rewards total. In one embodiment, the traveler's current context is determined and matched to promotion alert criteria. The traveler is then alerted, over the network, that a travel rewards promotion is available to the respective traveler in the respective traveler's current context, the alert comprising a representation of the travel rewards criteria.

16 Claims, 4 Drawing Sheets

(56) References Cited

U.S. PATENT DOCUMENTS

| | | |
|---|---|---|
| 5,459,859 A | 10/1995 | Senda |
| 5,513,126 A | 4/1996 | Harkins et al. |
| 5,548,515 A | 8/1996 | Pilley et al. |
| 5,559,707 A | 9/1996 | DeLorme et al. |
| 5,615,121 A | 3/1997 | Babayev et al. |
| 5,623,404 A | 4/1997 | Collins et al. |
| 5,655,081 A | 8/1997 | Bonnell et al. |
| 5,754,953 A | 5/1998 | Briancon et al. |
| 5,765,140 A | 6/1998 | Knudson |
| 5,790,974 A | 8/1998 | Tognazzini |
| 5,809,250 A | 9/1998 | Kisor |
| 5,812,844 A | 9/1998 | Jones et al. |
| 5,832,451 A | 11/1998 | Flake et al. |
| 5,832,453 A | 11/1998 | O'Brien |
| 5,839,114 A | 11/1998 | Lynch et al. |
| 5,850,433 A | 12/1998 | Rondeau |
| 5,862,490 A | 1/1999 | Sasuta et al. |
| 5,875,436 A | 2/1999 | Kikinis |
| 5,892,909 A | 4/1999 | Grasso et al. |
| 5,901,352 A | 5/1999 | St-Pierre et al. |
| 5,924,080 A | 7/1999 | Johnson |
| 5,933,485 A | 8/1999 | Chang et al. |
| 5,943,652 A | 8/1999 | Sisley et al. |
| 5,948,040 A | 9/1999 | DeLorme et al. |
| 5,953,706 A | 9/1999 | Patel |
| 5,963,861 A | 10/1999 | Hanson |
| 5,963,913 A | 10/1999 | Henneuse et al. |
| 5,966,658 A | 10/1999 | Kennedy et al. |
| 5,987,377 A | 11/1999 | Westerlage et al. |
| 6,009,408 A | 12/1999 | Buchanan |
| 6,011,976 A | 1/2000 | Michaels et al. |
| 6,016,478 A | 1/2000 | Zhang et al. |
| 6,018,715 A | 1/2000 | Lynch et al. |
| 6,023,679 A | 2/2000 | Acebo et al. |
| 6,023,722 A | 2/2000 | Colyer |
| 6,035,332 A | 3/2000 | Ingrassia et al. |
| 6,038,542 A | 3/2000 | Ruckdashei |
| 6,041,305 A | 3/2000 | Sakurai |
| 6,044,257 A | 3/2000 | Boling et al. |
| 6,047,327 A | 4/2000 | Tso et al. |
| 6,049,778 A | 4/2000 | Walker et al. |
| 6,052,563 A | 4/2000 | Macko |
| 6,058,179 A | 5/2000 | Shaffer et al. |
| 6,076,108 A | 6/2000 | Courts et al. |
| 6,085,166 A | 7/2000 | Beckhardt et al. |
| 6,091,956 A | 7/2000 | Hollenberg |
| 6,094,681 A | 7/2000 | Shaffer et al. |
| 6,101,480 A | 8/2000 | Conmy et al. |
| 6,104,788 A | 8/2000 | Shaffer et al. |
| 6,119,094 A | 9/2000 | Lynch et al. |
| 6,134,534 A | 10/2000 | Walker et al. |
| 6,144,942 A | 11/2000 | Ruckdashei |
| 6,148,261 A | 11/2000 | Obradovich et al. |
| 6,157,945 A | 12/2000 | Balma et al. |
| 6,169,955 B1 | 1/2001 | Fultz |
| 6,173,279 B1 | 1/2001 | Levin et al. |
| 6,177,905 B1 | 1/2001 | Welch |
| 6,189,003 B1 | 2/2001 | Leal |
| 6,202,062 B1 | 3/2001 | Cameron et al. |
| 6,216,227 B1 | 4/2001 | Goldstein et al. |
| 6,236,978 B1 | 5/2001 | Tuzhilin |
| 6,240,396 B1 | 5/2001 | Walker et al. |
| 6,249,252 B1 | 6/2001 | Dupray |
| 6,253,369 B1 | 6/2001 | Cloud et al. |
| 6,286,046 B1 | 9/2001 | Bryant |
| 6,292,783 B1 | 9/2001 | Rohler et al. |
| 6,292,830 B1 | 9/2001 | Taylor et al. |
| 6,295,521 B1 | 9/2001 | DeMarcken et al. |
| 6,298,352 B1 | 10/2001 | Kannan et al. |
| 6,301,533 B1 | 10/2001 | Markow |
| 6,317,686 B1 | 11/2001 | Ran |
| 6,321,158 B1 | 11/2001 | DeLorme et al. |
| 6,327,359 B1 | 12/2001 | Kang et al. |
| 6,334,109 B1 | 12/2001 | Kanevsky et al. |
| 6,336,072 B1 | 1/2002 | Takayama et al. |
| 6,341,271 B1 | 1/2002 | Salvo et al. |
| 6,349,238 B1 | 2/2002 | Gabbita et al. |
| 6,360,205 B1 | 3/2002 | Iyengar et al. |
| 6,370,566 B2 | 4/2002 | Discolo et al. |
| 6,374,176 B1 | 4/2002 | Schmier et al. |
| 6,381,640 B1 | 4/2002 | Beck et al. |
| 6,389,454 B1 | 5/2002 | Ralston et al. |
| 6,392,669 B1 | 5/2002 | Matoba et al. |
| 6,396,920 B1 | 5/2002 | Cox et al. |
| 6,397,191 B1 | 5/2002 | Notaini et al. |
| 6,414,635 B1 | 7/2002 | Stewart et al. |
| 6,418,471 B1 | 7/2002 | Shelton et al. |
| 6,421,705 B1 | 7/2002 | Northrup |
| 6,442,526 B1 | 8/2002 | Vance et al. |
| 6,456,207 B1 | 9/2002 | Yen |
| 6,456,709 B1 | 9/2002 | Cox et al. |
| 6,457,045 B1 | 9/2002 | Hanson et al. |
| 6,457,062 B1 | 9/2002 | Pivowar et al. |
| 6,457,132 B1 | 9/2002 | Borgendale et al. |
| 6,466,161 B2 | 10/2002 | Turetzky et al. |
| 6,477,503 B1 | 11/2002 | Mankes |
| 6,480,830 B1 | 11/2002 | Ford et al. |
| 6,484,033 B2 | 11/2002 | Murray |
| 6,501,421 B1 | 12/2002 | Dutta et al. |
| 6,519,571 B1 | 2/2003 | Guheen et al. |
| 6,529,136 B2 | 3/2003 | Cao et al. |
| 6,553,346 B1 | 4/2003 | Walker et al. |
| 6,571,213 B1 | 5/2003 | Altendahl et al. |
| 6,574,329 B2 | 6/2003 | Takeuchi et al. |
| 6,578,005 B1 | 6/2003 | Lesaint et al. |
| 6,584,448 B1 | 6/2003 | Laor |
| 6,584,489 B1 | 6/2003 | Jones et al. |
| 6,587,827 B1 | 7/2003 | Hennig et al. |
| 6,587,835 B1 | 7/2003 | Treyz et al. |
| 6,591,263 B1 | 7/2003 | Becker et al. |
| 6,611,726 B1 | 8/2003 | Crosswhite |
| 6,618,668 B1 | 9/2003 | Laird |
| 6,631,363 B1 | 10/2003 | Brown et al. |
| 6,640,230 B1 | 10/2003 | Alexander et al. |
| 6,643,622 B2 | 11/2003 | Stuart et al. |
| 6,643,639 B2 | 11/2003 | Biebesheimer et al. |
| 6,650,902 B1 | 11/2003 | Richton |
| 6,658,093 B1 | 12/2003 | Langseth et al. |
| 6,662,016 B1 | 12/2003 | Buckham et al. |
| 6,675,151 B1 | 1/2004 | Thompson et al. |
| 6,687,678 B1 | 2/2004 | Yorimatsu et al. |
| 6,691,029 B2 | 2/2004 | Hughes et al. |
| 6,691,153 B1 | 2/2004 | Hanson et al. |
| 6,700,535 B2 | 3/2004 | Gilkes et al. |
| 6,701,311 B2 | 3/2004 | Biebesheimer et al. |
| 6,732,080 B1 | 5/2004 | Blants |
| 6,732,103 B1 | 5/2004 | Strick et al. |
| 6,741,969 B1 | 5/2004 | Chen et al. |
| 6,757,689 B2 | 6/2004 | Battas et al. |
| 6,766,363 B1 | 7/2004 | Rothschild |
| 6,769,009 B1 | 7/2004 | Reisman |
| 6,775,371 B2 | 8/2004 | Elsey et al. |
| 6,785,592 B1 | 8/2004 | Smith et al. |
| 6,788,946 B2 | 9/2004 | Winchell et al. |
| 6,801,226 B1 | 10/2004 | Daughtery |
| 6,802,005 B1 | 10/2004 | Berson |
| 6,804,658 B2 | 10/2004 | Lim et al. |
| 6,826,473 B1 | 11/2004 | Burch et al. |
| 6,837,427 B2 | 1/2005 | Overhultz et al. |
| 6,842,737 B1 | 1/2005 | Stiles et al. |
| 6,845,370 B2 | 1/2005 | Burkey et al. |
| 6,847,988 B2 | 1/2005 | Toyouchi et al. |
| 6,857,017 B1 | 2/2005 | Faour et al. |
| 6,862,575 B1 | 3/2005 | Anttila et al. |
| 6,868,335 B2 | 3/2005 | Obradovich et al. |
| 6,882,719 B2 | 4/2005 | Lee |
| 6,885,996 B2 | 4/2005 | Nicholson |
| 6,901,438 B1 | 5/2005 | Davis et al. |
| 6,907,119 B2 | 6/2005 | Case et al. |
| 6,909,903 B2 | 6/2005 | Wang |
| 6,934,684 B2 | 8/2005 | Alpdemir et al. |
| 6,937,991 B1 | 8/2005 | Zompa et al. |
| 6,944,273 B2 | 9/2005 | Huna |
| 6,944,479 B2 | 9/2005 | Andaker et al. |

(56) References Cited

U.S. PATENT DOCUMENTS

| | | |
|---|---|---|
| 6,958,692 B1 | 10/2005 | Ratschunas |
| 6,959,287 B2 | 10/2005 | Rabideau et al. |
| 6,970,871 B1 | 11/2005 | Rayburn |
| 6,980,993 B2 | 12/2005 | Horvitz et al. |
| 6,985,902 B2 | 1/2006 | Wise et al. |
| 6,985,939 B2 | 1/2006 | Fletcher et al. |
| 6,993,503 B1 | 1/2006 | Heissenbuttel et al. |
| 6,993,554 B2 | 1/2006 | O'Donnell |
| 7,010,494 B2 | 3/2006 | Etzioni et al. |
| 7,013,149 B2 | 3/2006 | Vetro et al. |
| 7,024,205 B1 | 4/2006 | Hose |
| 7,027,570 B2 | 4/2006 | Pines et al. |
| 7,031,945 B1 | 4/2006 | Donner |
| 7,031,998 B2 | 4/2006 | Archbold |
| 7,035,811 B2 | 4/2006 | Gorenstein |
| 7,050,986 B1 | 5/2006 | Vance et al. |
| 7,050,987 B2 | 5/2006 | Lettovsky et al. |
| 7,054,939 B2 | 5/2006 | Koch et al. |
| 7,065,526 B2 | 6/2006 | Wissner et al. |
| 7,072,666 B1 | 7/2006 | Kullman et al. |
| 7,072,886 B2 | 7/2006 | Salmenkaita et al. |
| 7,076,431 B2 | 7/2006 | Kurganov et al. |
| 7,076,451 B1 | 7/2006 | Coupland et al. |
| 7,082,402 B2 | 7/2006 | Conmy et al. |
| 7,092,892 B1 | 8/2006 | Sobalvarro et al. |
| 7,099,236 B2 | 8/2006 | Yamagishi |
| 7,099,855 B1 | 8/2006 | Nelken et al. |
| 7,103,572 B1 | 9/2006 | Kawaguchi et al. |
| 7,113,797 B2 | 9/2006 | Kelly et al. |
| 7,123,141 B2 | 10/2006 | Contestabile |
| 7,124,024 B1 | 10/2006 | Adelaide et al. |
| 7,124,089 B2 | 10/2006 | Cornwell |
| 7,130,885 B2 | 10/2006 | Chandra et al. |
| 7,136,821 B1 | 11/2006 | Kohavi et al. |
| 7,139,718 B2 | 11/2006 | Jeyachandran et al. |
| 7,139,978 B2 | 11/2006 | Rojewski |
| 7,152,038 B2 | 12/2006 | Murashite et al. |
| 7,154,621 B2 | 12/2006 | Rodriguez et al. |
| 7,161,497 B2 | 1/2007 | Gueziec |
| 7,168,077 B2 | 1/2007 | Kim et al. |
| 7,171,369 B1 | 1/2007 | Bertram et al. |
| 7,188,073 B1 | 3/2007 | Tam et al. |
| 7,188,155 B2 | 3/2007 | Flurry et al. |
| 7,194,417 B1 | 3/2007 | Jones |
| 7,213,048 B1 | 5/2007 | Parupudi et al. |
| 7,222,334 B2 | 5/2007 | Casati et al. |
| 7,233,955 B2 | 6/2007 | Machida et al. |
| 7,236,942 B1 | 6/2007 | Walker et al. |
| RE39,717 E | 7/2007 | Yates et al. |
| 7,249,195 B2 | 7/2007 | Panec et al. |
| 7,259,694 B2 | 8/2007 | Myllymaki |
| 7,263,664 B1 | 8/2007 | Daughtery |
| 7,280,823 B2 | 10/2007 | Ternullo et al. |
| 7,283,970 B2 | 10/2007 | Cragun et al. |
| 7,284,002 B2 | 10/2007 | Doss et al. |
| 7,284,033 B2 | 10/2007 | Jhanji |
| 7,287,093 B2 | 10/2007 | Lynch et al. |
| 7,289,812 B1 | 10/2007 | Roberts et al. |
| 7,296,017 B2 | 11/2007 | Larcheveque et al. |
| 7,299,286 B2 | 11/2007 | Ramsayer et al. |
| 7,300,346 B2 | 11/2007 | Lydon et al. |
| 7,305,356 B2 | 12/2007 | Rodon |
| 7,305,454 B2 | 12/2007 | Reese et al. |
| 7,308,420 B1 | 12/2007 | Storch et al. |
| 7,328,406 B2 | 2/2008 | Kalinoski et al. |
| 7,330,112 B1 | 2/2008 | Emigh et al. |
| 7,337,125 B2 | 2/2008 | Kraft et al. |
| 7,340,048 B2 | 3/2008 | Stern et al. |
| 7,343,165 B2 | 3/2008 | Obradovich |
| 7,343,317 B2 | 3/2008 | Jokinen et al. |
| 7,343,325 B2 | 3/2008 | Shaver et al. |
| 7,343,338 B2 | 3/2008 | Etkin |
| 7,359,716 B2 | 4/2008 | Rowitch et al. |
| 7,367,491 B2 | 5/2008 | Cheng et al. |
| 7,370,085 B2 | 5/2008 | Brown et al. |
| 7,376,735 B2 | 5/2008 | Straut et al. |
| 7,383,225 B2 | 6/2008 | Hallihan |
| 7,394,900 B1 | 7/2008 | Gerber et al. |
| 7,395,221 B2 | 7/2008 | Doss et al. |
| 7,395,231 B2 | 7/2008 | Steury et al. |
| 7,403,948 B2 | 7/2008 | Ghoneimy et al. |
| 7,409,643 B2 | 8/2008 | Daughtery |
| 7,412,042 B2 | 8/2008 | Henry |
| 7,415,510 B1 | 8/2008 | Kramerich et al. |
| 7,418,409 B1 | 8/2008 | Goel |
| 7,424,292 B2 | 9/2008 | Kobylarz |
| 7,426,537 B2 | 9/2008 | Lee et al. |
| 7,430,724 B2 | 9/2008 | Othmer |
| 7,441,203 B2 | 10/2008 | Othmer et al. |
| 7,475,145 B2 | 1/2009 | Bizniak et al. |
| 7,487,112 B2 | 2/2009 | Barnes |
| 7,506,805 B1 | 3/2009 | Chakravarthy |
| 7,562,027 B1 | 7/2009 | Baggett et al. |
| 7,599,858 B1 | 10/2009 | Grady |
| 7,603,291 B2 | 10/2009 | Raiyani et al. |
| 7,620,619 B1 | 11/2009 | Walker et al. |
| 7,681,786 B1 | 3/2010 | Chakravarthy |
| 7,706,808 B1 | 4/2010 | Aggarwal et al. |
| 7,742,954 B1 | 6/2010 | Handel |
| 7,806,328 B2 | 10/2010 | Chakravarthy |
| 7,925,540 B1 | 4/2011 | Orttung |
| 7,970,666 B1 | 6/2011 | Handel et al. |
| 8,055,534 B2 | 11/2011 | Ashby et al. |
| 8,117,073 B1 | 2/2012 | Orttung |
| 8,180,796 B1 | 5/2012 | Mah et al. |
| 8,543,470 B2 | 9/2013 | Grady et al. |
| 9,117,223 B1 | 8/2015 | Handel et al. |
| 10,217,131 B2 | 2/2019 | Handel et al. |
| 2001/0014866 A1 | 8/2001 | Conmy et al. |
| 2001/0014867 A1 | 8/2001 | Conmy |
| 2001/0025314 A1 | 9/2001 | Matsumoto et al. |
| 2001/0029425 A1 | 10/2001 | Myr |
| 2001/0042010 A1 | 11/2001 | Hassell |
| 2001/0044748 A1 | 11/2001 | Maier |
| 2001/0047316 A1 | 11/2001 | Hallihan |
| 2001/0049637 A1 | 12/2001 | Tso |
| 2001/0051876 A1 | 12/2001 | Seigel et al. |
| 2001/0056354 A1 | 12/2001 | Feit et al. |
| 2002/0000930 A1 | 1/2002 | Crowson et al. |
| 2002/0007327 A1 | 1/2002 | Steury et al. |
| 2002/0010604 A1 | 1/2002 | Block |
| 2002/0010664 A1 | 1/2002 | Rabideau et al. |
| 2002/0013729 A1 | 1/2002 | Kida |
| 2002/0016723 A1 | 2/2002 | Matsui et al. |
| 2002/0023132 A1 | 2/2002 | Tornabene et al. |
| 2002/0026336 A1 | 2/2002 | Eizenburg et al. |
| 2002/0026356 A1 | 2/2002 | Bergh et al. |
| 2002/0029178 A1 | 3/2002 | Wiederin et al. |
| 2002/0032591 A1 | 3/2002 | Mahaffy et al. |
| 2002/0032597 A1 | 3/2002 | Chanos |
| 2002/0035474 A1 | 3/2002 | Alpdemir |
| 2002/0046076 A1 | 4/2002 | Baillargeon et al. |
| 2002/0046084 A1 | 4/2002 | Steele et al. |
| 2002/0046301 A1 | 4/2002 | Shannon et al. |
| 2002/0049644 A1 | 4/2002 | Kargman |
| 2002/0055906 A1 | 5/2002 | Katz et al. |
| 2002/0057212 A1 | 5/2002 | Hamilton et al. |
| 2002/0067308 A1 | 6/2002 | Robertson |
| 2002/0069093 A1 | 6/2002 | Stanfield |
| 2002/0072938 A1 | 6/2002 | Black et al. |
| 2002/0073088 A1 | 6/2002 | Beckmann et al. |
| 2002/0077871 A1 | 6/2002 | Udelhoven et al. |
| 2002/0082978 A1 | 6/2002 | Ghouri et al. |
| 2002/0087367 A1 | 7/2002 | Azani |
| 2002/0087384 A1 | 7/2002 | Neifeld |
| 2002/0087706 A1 | 7/2002 | Ogawa |
| 2002/0095333 A1 | 7/2002 | Jokinen et al. |
| 2002/0095454 A1 | 7/2002 | Reed et al. |
| 2002/0099613 A1 | 7/2002 | Swart et al. |
| 2002/0103746 A1 | 8/2002 | Moffett |
| 2002/0107027 A1 | 8/2002 | O'Neil |
| 2002/0111845 A1 | 8/2002 | Chong |
| 2002/0111848 A1 | 8/2002 | White |
| 2002/0115430 A1 | 8/2002 | Hall |

(56) References Cited

U.S. PATENT DOCUMENTS

| | | |
|---|---|---|
| 2002/0116235 A1 | 8/2002 | Grimm et al. |
| 2002/0116266 A1 | 8/2002 | Marshall |
| 2002/0118118 A1 | 8/2002 | Myllymaki |
| 2002/0120519 A1 | 8/2002 | Martin et al. |
| 2002/0120548 A1 | 8/2002 | Etkin |
| 2002/0128903 A1 | 9/2002 | Kernahan |
| 2002/0131565 A1 | 9/2002 | Scheuring et al. |
| 2002/0143655 A1 | 10/2002 | Elston et al. |
| 2002/0143819 A1 | 10/2002 | Han et al. |
| 2002/0145561 A1* | 10/2002 | Sandhu ............... G01S 5/0072 342/357.34 |
| 2002/0151321 A1 | 10/2002 | Winchell et al. |
| 2002/0152190 A1 | 10/2002 | Biebesheimer et al. |
| 2002/0156659 A1 | 10/2002 | Walker et al. |
| 2002/0156731 A1 | 10/2002 | Seki et al. |
| 2002/0156839 A1 | 10/2002 | Peterson et al. |
| 2002/0160745 A1 | 10/2002 | Wang |
| 2002/0161611 A1 | 10/2002 | Price et al. |
| 2002/0165732 A1 | 11/2002 | Ezzeddine et al. |
| 2002/0165903 A1 | 11/2002 | Zargham et al. |
| 2002/0174021 A1 | 11/2002 | Chu et al. |
| 2002/0178034 A1 | 11/2002 | Gardner et al. |
| 2002/0178226 A1 | 11/2002 | Anderson et al. |
| 2002/0184302 A1 | 12/2002 | Prueitt et al. |
| 2002/0194037 A1 | 12/2002 | Creed et al. |
| 2002/0194262 A1 | 12/2002 | Jorgenson |
| 2003/0004762 A1 | 1/2003 | Banerjee et al. |
| 2003/0013438 A1 | 1/2003 | Darby |
| 2003/0018499 A1 | 1/2003 | Miller et al. |
| 2003/0018551 A1 | 1/2003 | Hanson et al. |
| 2003/0018808 A1 | 1/2003 | Brouk et al. |
| 2003/0023463 A1 | 1/2003 | Dombroski et al. |
| 2003/0023499 A1 | 1/2003 | Das et al. |
| 2003/0028390 A1 | 2/2003 | Stern et al. |
| 2003/0033164 A1 | 2/2003 | Faltings et al. |
| 2003/0033179 A1 | 2/2003 | Katz et al. |
| 2003/0036917 A1 | 2/2003 | Hite et al. |
| 2003/0040946 A1 | 2/2003 | Sprenger et al. |
| 2003/0041178 A1 | 2/2003 | Brouk et al. |
| 2003/0050964 A1 | 3/2003 | Debaty et al. |
| 2003/0053459 A1 | 3/2003 | Brouk et al. |
| 2003/0053611 A1 | 3/2003 | Lee |
| 2003/0058842 A1 | 3/2003 | Bud |
| 2003/0061145 A1 | 3/2003 | Norrid |
| 2003/0065556 A1 | 4/2003 | Takanashi et al. |
| 2003/0065805 A1 | 4/2003 | Barnes |
| 2003/0087648 A1 | 5/2003 | Mezhvinsky et al. |
| 2003/0097302 A1 | 5/2003 | Overhultz et al. |
| 2003/0100315 A1 | 5/2003 | Rankin |
| 2003/0110070 A1 | 6/2003 | De Goeij |
| 2003/0110091 A1 | 6/2003 | Inaba et al. |
| 2003/0120530 A1 | 6/2003 | Casati et al. |
| 2003/0120593 A1 | 6/2003 | Bansai et al. |
| 2003/0126095 A1 | 7/2003 | Allen |
| 2003/0126205 A1 | 7/2003 | Lurie |
| 2003/0126250 A1 | 7/2003 | Jhanji |
| 2003/0132298 A1 | 7/2003 | Swartz et al. |
| 2003/0140172 A1 | 7/2003 | Woods et al. |
| 2003/0149641 A1 | 8/2003 | Kouketsu et al. |
| 2003/0154116 A1 | 8/2003 | Lofton |
| 2003/0154125 A1 | 8/2003 | Mittal et al. |
| 2003/0158493 A1 | 8/2003 | Nicholson |
| 2003/0158776 A1 | 8/2003 | Landesmann |
| 2003/0158784 A1 | 8/2003 | Shaver et al. |
| 2003/0158847 A1 | 8/2003 | Wissner et al. |
| 2003/0163251 A1 | 8/2003 | Obradovich et al. |
| 2003/0204622 A1 | 8/2003 | Bizniak et al. |
| 2003/0212486 A1 | 8/2003 | Hughes et al. |
| 2003/0165223 A1 | 9/2003 | Timmins et al. |
| 2003/0171944 A1 | 9/2003 | Fine et al. |
| 2003/0172020 A1 | 9/2003 | Davis et al. |
| 2003/0182413 A1 | 9/2003 | Allen et al. |
| 2003/0187705 A1 | 10/2003 | Schiff et al. |
| 2003/0187743 A1 | 10/2003 | Kumaran et al. |
| 2003/0194065 A1 | 10/2003 | Langseth et al. |
| 2003/0195811 A1 | 10/2003 | Hayes et al. |
| 2003/0200146 A1 | 10/2003 | Levin et al. |
| 2003/0208754 A1 | 11/2003 | Sridhar et al. |
| 2003/0217044 A1 | 11/2003 | Zhang et al. |
| 2003/0220835 A1 | 11/2003 | Barnes, Jr. |
| 2003/0229900 A1 | 12/2003 | Reisman |
| 2003/0233265 A1 | 12/2003 | Lee et al. |
| 2003/0233278 A1 | 12/2003 | Marshall |
| 2004/0014457 A1 | 1/2004 | Stevens |
| 2004/0015380 A1 | 1/2004 | Timmins |
| 2004/0030568 A1 | 2/2004 | Kocznar et al. |
| 2004/0039613 A1 | 2/2004 | Maycotte et al. |
| 2004/0045004 A1 | 3/2004 | Cheenath |
| 2004/0054569 A1 | 3/2004 | Pombo et al. |
| 2004/0054574 A1 | 3/2004 | Kaufman et al. |
| 2004/0064355 A1 | 4/2004 | Dorenbosch et al. |
| 2004/0064503 A1 | 4/2004 | Karakashian et al. |
| 2004/0064585 A1 | 4/2004 | Doss et al. |
| 2004/0073615 A1 | 4/2004 | Darling |
| 2004/0076280 A1 | 4/2004 | Ando et al. |
| 2004/0078247 A1 | 4/2004 | Rowe et al. |
| 2004/0078373 A1 | 4/2004 | Ghoneimy et al. |
| 2004/0088107 A1 | 5/2004 | Seligmann |
| 2004/0093290 A1 | 5/2004 | Doss et al. |
| 2004/0098269 A1 | 5/2004 | Wise et al. |
| 2004/0204977 A1 | 6/2004 | Obert |
| 2004/0128173 A1 | 7/2004 | Salonen |
| 2004/0128196 A1 | 7/2004 | Shibuno |
| 2004/0139151 A1 | 7/2004 | Flurry et al. |
| 2004/0142678 A1 | 7/2004 | Krasner |
| 2004/0142709 A1 | 7/2004 | Coskun et al. |
| 2004/0148207 A1 | 7/2004 | Smith et al. |
| 2004/0153350 A1 | 8/2004 | Kim et al. |
| 2004/0158493 A1 | 8/2004 | Nicholson |
| 2004/0161097 A1 | 8/2004 | Henry |
| 2004/0181461 A1 | 9/2004 | Raiyani et al. |
| 2004/0181572 A1 | 9/2004 | Lee et al. |
| 2004/0184593 A1 | 9/2004 | Elsey et al. |
| 2004/0186891 A1 | 9/2004 | Panec et al. |
| 2004/0193432 A1 | 9/2004 | Khalidi |
| 2004/0193457 A1 | 9/2004 | Shogren |
| 2004/0203909 A1 | 10/2004 | Koster |
| 2004/0215517 A1 | 10/2004 | Chen et al. |
| 2004/0220847 A1 | 11/2004 | Oguishi et al. |
| 2004/0220854 A1 | 11/2004 | Postrel |
| 2004/0224703 A1 | 11/2004 | Takaki et al. |
| 2004/0225540 A1 | 11/2004 | Waytena et al. |
| 2004/0238622 A1* | 12/2004 | Freiberg ............... G06Q 20/06 235/380 |
| 2004/0248551 A1 | 12/2004 | Rowitch et al. |
| 2004/0249700 A1 | 12/2004 | Gross |
| 2004/0249758 A1 | 12/2004 | Sukeda et al. |
| 2004/0267611 A1 | 12/2004 | Hoerenz |
| 2005/0004819 A1 | 1/2005 | Etzioni et al. |
| 2005/0010472 A1 | 1/2005 | Quatse et al. |
| 2005/0014558 A1 | 1/2005 | Estey |
| 2005/0024189 A1 | 2/2005 | Weber |
| 2005/0027570 A1 | 2/2005 | Maier et al. |
| 2005/0033614 A1 | 2/2005 | Lettovsky et al. |
| 2005/0033615 A1 | 2/2005 | Nguyen et al. |
| 2005/0033616 A1 | 2/2005 | Vavul et al. |
| 2005/0033670 A1 | 2/2005 | Cheng et al. |
| 2005/0039136 A1 | 2/2005 | Othmer |
| 2005/0040230 A1 | 2/2005 | Swartz et al. |
| 2005/0040944 A1 | 2/2005 | Contestabile |
| 2005/0043974 A1 | 2/2005 | Vassilev et al. |
| 2005/0053220 A1 | 3/2005 | Helbling et al. |
| 2005/0071245 A1 | 3/2005 | Norins et al. |
| 2005/0086098 A1 | 4/2005 | Fulton et al. |
| 2005/0091005 A1 | 4/2005 | Huard |
| 2005/0101335 A1 | 5/2005 | Kelly et al. |
| 2005/0125265 A1 | 6/2005 | Bramnick et al. |
| 2005/0125439 A1 | 6/2005 | Nourbakhsh et al. |
| 2005/0125804 A1 | 6/2005 | Dievendorff et al. |
| 2005/0131761 A1 | 6/2005 | Trika et al. |
| 2005/0138187 A1 | 6/2005 | Breiter et al. |
| 2005/0143064 A1 | 6/2005 | Pines et al. |
| 2005/0149385 A1 | 7/2005 | Trively |
| 2005/0154736 A1 | 7/2005 | Meikleham et al. |

(56) References Cited

U.S. PATENT DOCUMENTS

| | | |
|---|---|---|
| 2005/0209772 A1 | 9/2005 | Yoshikawa et al. |
| 2005/0209902 A1 | 9/2005 | Iwasaki et al. |
| 2005/0215247 A1 | 9/2005 | Kobylarz |
| 2005/0227712 A1 | 10/2005 | Estevez et al. |
| 2005/0228719 A1* | 10/2005 | Roberts .................. G06Q 30/02 705/14.58 |
| 2005/0234928 A1 | 10/2005 | Shkvarchuk et al. |
| 2005/0255861 A1 | 11/2005 | Wilson et al. |
| 2005/0273373 A1 | 12/2005 | Walker et al. |
| 2005/0288948 A1 | 12/2005 | Devulapalli et al. |
| 2006/0004511 A1 | 1/2006 | Yoshikawa et al. |
| 2006/0009987 A1 | 1/2006 | Wang |
| 2006/0010206 A1 | 1/2006 | Apacible et al. |
| 2006/0020565 A1 | 1/2006 | Rzevski et al. |
| 2006/0041477 A1 | 2/2006 | Zheng |
| 2006/0059023 A1 | 3/2006 | Mashinsky |
| 2006/0059024 A1 | 3/2006 | Bailey et al. |
| 2006/0059107 A1 | 3/2006 | Elmore et al. |
| 2006/0068787 A1 | 3/2006 | Deshpande et al. |
| 2006/0080257 A1 | 4/2006 | Vaughan et al. |
| 2006/0080321 A1 | 4/2006 | Horn et al. |
| 2006/0085276 A1 | 4/2006 | Hoech et al. |
| 2006/0085512 A1 | 4/2006 | Handel |
| 2006/0090185 A1 | 4/2006 | Zito et al. |
| 2006/0095329 A1 | 5/2006 | Kim |
| 2006/0111955 A1 | 5/2006 | Winter et al. |
| 2006/0173747 A1 | 8/2006 | Gantman et al. |
| 2006/0178932 A1 | 8/2006 | Lang |
| 2006/0206412 A1 | 9/2006 | Van Luchene et al. |
| 2006/0235754 A1 | 10/2006 | Walker et al. |
| 2006/0247954 A1 | 11/2006 | Hunt |
| 2006/0287897 A1 | 12/2006 | Sobalvarro et al. |
| 2007/0016439 A1 | 1/2007 | Stiles et al. |
| 2007/0016514 A1 | 1/2007 | A-Abdulqader et al. |
| 2007/0033087 A1 | 2/2007 | Combs et al. |
| 2007/0060099 A1 | 3/2007 | Ramer et al. |
| 2007/0143153 A1 | 6/2007 | Ashby et al. |
| 2007/0150349 A1 | 6/2007 | Handel |
| 2007/0162301 A1 | 7/2007 | Sussman et al. |
| 2007/0162328 A1 | 7/2007 | Reich |
| 2007/0174438 A9 | 7/2007 | Johnson et al. |
| 2007/0179836 A1* | 8/2007 | Juang et al. .................. 705/10 |
| 2007/0192186 A1* | 8/2007 | Greene .................. G06Q 10/02 705/14.27 |
| 2007/0198432 A1 | 8/2007 | Pitroda et al. |
| 2007/0208604 A1 | 9/2007 | Purohit et al. |
| 2007/0244766 A1 | 10/2007 | Goel |
| 2008/0004917 A1 | 1/2008 | Mortimore |
| 2008/0004918 A1 | 1/2008 | Orttung |
| 2008/0004919 A1 | 1/2008 | Stubbs |
| 2008/0004921 A1 | 1/2008 | Orttung |
| 2008/0004980 A1 | 1/2008 | Hernandez |
| 2008/0010100 A1 | 1/2008 | Orttung |
| 2008/0046298 A1 | 2/2008 | Ben-Yehuda et al. |
| 2008/0052413 A1* | 2/2008 | Wang ................ G06F 17/30867 709/246 |
| 2008/0065509 A1 | 3/2008 | Williams |
| 2008/0086564 A1 | 4/2008 | Putman et al. |
| 2008/0091477 A1 | 4/2008 | Mortimore |
| 2008/0091478 A1 | 4/2008 | Messa |
| 2008/0091479 A1 | 4/2008 | Mortimore |
| 2008/0147450 A1 | 6/2008 | Mortimore |
| 2008/0155470 A1 | 6/2008 | Khedouri et al. |
| 2008/0201197 A1 | 8/2008 | Orttung |
| 2008/0201432 A1 | 8/2008 | Orttung |
| 2008/0248815 A1* | 10/2008 | Busch .................... H04W 4/02 455/456.5 |
| 2009/0006143 A1 | 1/2009 | Orttung |
| 2009/0030609 A1 | 1/2009 | Orttung |
| 2009/0030742 A1 | 1/2009 | Orttung |
| 2009/0030769 A1 | 1/2009 | Orttung |
| 2009/0055271 A1* | 2/2009 | Drefs ................ G06Q 30/0226 705/14.27 |
| 2009/0101710 A1 | 4/2009 | Chakravarthy |
| 2009/0112639 A1* | 4/2009 | Robinson Beaver ............. 705/5 |
| 2009/0125380 A1 | 5/2009 | Otto et al. |
| 2009/0210261 A1 | 8/2009 | Mortimore, Jr. |
| 2009/0248457 A1 | 10/2009 | Munter |
| 2010/0023407 A1 | 1/2010 | Grady |
| 2010/0161392 A1* | 6/2010 | Ashby et al. .................. 705/13 |
| 2010/0317420 A1 | 12/2010 | Hoffberg |
| 2011/0004497 A1 | 1/2011 | Mortimore, Jr. et al. |
| 2016/0055523 A1 | 2/2016 | Handel et al. |
| 2019/0180323 A1 | 6/2019 | Handel et al. |

OTHER PUBLICATIONS

Amendment and Response to Non-Final Office Action filed at the U.S. Patent & Trademark Office dated Oct. 27, 2008, for U.S. Appl. No. 11/388,360.

Business Editors, "Restaurant Row Selects ServeClick from Connectria to Power its Advanced Online Restaurant E-scheduling," Business Wire, New York, Feb. 1, 2000.

Chakravarthy, Sriram et al., U.S. Appl. No. 11/178,107, entitled "Asynchronous, Location-Independent Web Service Invocation," filed Jul. 7, 2005.

Grady, Patrick et al., U.S. Appl. No. 10/338,363, entitled "Automatic Services Exchange," filed Jan. 7, 2003.

Grady, Patrick et al., U.S. Appl. No. 10/855,269, entitled "Coordination for Group Procurement of Services," filed May 26, 2004.

Handel, Sean et al., U.S. Appl. No. 11/321,769, entitled "Method and System for Prediction and Delivery of Time and Context Sensitive Services," filed Dec. 28, 2005.

Handel, Sean et al., U.S. Appl. No. 11/388,360, entitled "Method and System for Traffic Tracking and Conversion Tracking," filed Mar. 23, 2006.

Handel, Sean et al., U.S. Appl. No. 11/388,540, entitled "Method and System for Resource Planning for Service Provider," filed Mar. 23, 2006.

Hernandez, Rick et al., U.S. Appl. No. 11/323,766, entitled "Method and System for Transferring of Stateful Screen in a Stateless Session," filed Dec. 30, 2005.

Hwang, Yong Ho et al., "An efficient revocation scheme for stateless receievers," Editors: Katsikas -S-K, Gritzalis-S, Lopez-J, Jun. 2004, pp. 1-2.

Kanaley, Reid, "More Ways Than One to Access Crowded AOL," Philadelphia Enquirer, p. F1, Jan. 16, 1997.

Mah, Anson et al., U.S. Appl. No. 11/093,610, entitled "Supplier Integration With Services Buiness Language," filed Mar. 29, 2005.

Orbitz, LLC, search results of online search for flights at www.orbitz.com, Mar. 11, 2009.

Orttung, Mark et al., U.S. Appl. No. 10/943,608, entitled "Method and System for Delegation of Travel Arrangements by a Temporary Agent," filed Sep. 17, 2004.

Paranadi, Shiva et al., U.S. Appl. No. 11/315,421, entitled "Method and System for Interacting Via Messages with a Travel Services System," filed Dec. 21, 2005.

Patwardhan, Shantau et al., U.S. Appl. No. 11/121,861, entitled "Method and System for Reporting Work Hours by Phone or Other E-Media," filed May 3, 2005.

Patwardhan, Shantau et al., U.S. Appl. No. 11/178,032, entitled "Method and System for Booking an Open Return Ticket Online," filed Jul. 7, 2005.

Reed, Dan et al., "More people find ways to squeeze fun into work trips; For many business travelers, taking family or friends on a trip at relatively low cost has become a handy job perk," USA Today, McLean VA, May 20, 2003, p. E12.

Sharkey, Joe, "Leisure activities are increasingly being fitted in to help make life on the road less of a grind," The New York Times, New York, N.Y., Apr. 18, 2001, p. C6.

Smith, Calvin et al., "The Talaris Services Business Language: A Case Study on Developing XML Vocabulaires Using the Universal Business Language," School of Information Management & Systems, University of California, Sep. 2002, pp. 1-16.

Handel, Sean et al., U.S. Appl. No. 11/395,413, entitled "Method and System for Viral Distribution of Short-term Location Orientated Offers," filed Mar. 30, 2006.

(56) References Cited

OTHER PUBLICATIONS

System and Method for Availability-based Limited-time Offerings and Transactions, U.S. Appl. No. 10/869,356, filed Jun. 15, 2004, Inventor(s): Patrick Grady, et al, U.S. Pat. No. 7,599,858, Issue Date: Oct. 6, 2009.

System and Method for Targeting Limited-time Offer Based on Likelihood of Acceptance and Selecting Transmission Media Based on Customer Interest. U.S. Appl. No. 12/573,844, filed Oct. 5, 2009, Inventor(s): Patrick Grady, et al, U.S. Pat. No. 8,543,470, Issue Date: Sep. 24, 2013.

Method and System for Prediction and Delivery of Time-and Context-sensitive Services, U.S. Appl. No. 11/321,769, filed Dec. 28, 2005, Inventor(s): Sean Handel, et al, Status: Docketed New Case—Ready for Examination, Status Date: Jun. 12, 2019.

Method and System for Resource Planning for Service Provider, U.S. Appl. No. 11/388,540, filed Mar. 23, 2006, Inventor(s): Sean Handel, et al, U.S. Pat. No. 9,117,223, Issue Date: Aug. 25, 2015.

System for Resources Service Provider, U.S. Appl. No. 14/834,277, filed Aug. 24, 2015, Inventor(s): Sean Handel, et al, Status: Patented Case, Status Date: Feb. 6, 2019.

System for Resource Service Provider, U.S. Appl. No. 16/276,213, filed Feb. 14, 2019, Inventor(s): Sean Handel, et al, Status: Application Dispatched from Preexam, Not Yet Docketed, Status Date: Mar. 5, 2019.

Method and System for Traffic Tracking and Conversion Tracking, U.S. Appl. No. 11/388,360, filed Mar. 23, 2006, Inventor(s): Sean Handel, et al, Status: Abandoned—After Examiner's Answer or Board of Appeals Decision, Status Date: May 9, 2018.

Method and System for Viral Distribution of Short-term Location Oriented Offers, U.S. Appl. No. 11/395,413, filed Mar. 30, 2006, Inventor(s): Sean Handel, et al, Status: Abandoned—Failure to Respond to an Office Action, Status Date: Dec. 10, 2015.

Method and System for Culling Star Performers, Trendsetters and Connectors from Pool of Users, U.S. Appl. No. 11/479,097, filed Jun. 30, 2006, Inventor(s): Sean Handel, et al, Status: Abandoned—Failure to Respond to an Office Action, Status Date: Aug. 24, 2015.

\* cited by examiner

SYSTEM AND METHOD FOR OFFERING, TRACKING AND PROMOTING LOYALTY REWARDS

This application claims priority to the U.S. Provisional Patent Application entitled "System and Method for Offering, Tracking and Promoting Loyalty Rewards Including Geographic Focus", Ser. No. 61/174,445, that was filed Apr. 30, 2009, the entire disclosure of which is herein incorporated by reference in its entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for loyalty rewards programs, and more particularly, to systems and methods for system and methods for offering, tracking and promoting loyalty rewards including geographic focus.

BACKGROUND OF THE INVENTION

When a credit card company sponsors a promotion offering extra "reward" points for certain credit card transactions, the current promotional process is very slow and cumbersome and has very limited dynamics. For example, a credit card provider must send out inserts or must print on the body of its statements, or must send out an email to all customers, notifying all customers about the promotion. Then it takes some time for this promotional message to propagate. Also, typically, to keep it simple, such promotions are limited to just one category of good or service, such as, for example, automobile fuel, groceries, certain types of house wares, etc.

What is needed is a system and method that allows card issuers to manipulate or control rewards based on time, geography, context of use, and type of merchandise or merchant, each singly or in any combination.

SUMMARY OF THE INVENTION

In one embodiment, the invention is a method. Data to define a travel rewards promotion is received over a network. The travel rewards promotion comprises traveler eligibility criteria and travel rewards criteria. At least one traveler is selected, using at least one computing device, where the travel itinerary of the respective traveler matches traveler eligibility criteria for the promotion. The traveler is notified that he or she is eligible for the travel rewards promotion, the notification comprising a representation of the travel rewards criteria. A travel rewards promotion total is then compiled for the traveler and the traveler is notified of his or her respective promotion rewards total.

In one embodiment, the method additionally comprises determining, using the computing device, the traveler's current context. The traveler's current context is then matched to promotion alert criteria. The traveler is then altered alerted, over the network, that a travel rewards promotion is available to the traveler in the traveler's current context, the alert comprising a representation of the travel rewards criteria.

In one embodiment, the invention is a system comprising a plurality of modules each comprising one or more processors programmed to execute software code retrieved from a computer readable storage medium storing software for various functions. The system comprises: a promotion data receiving module for receiving, over a network, data to define travel rewards promotions comprising traveler eligibility criteria and travel rewards criteria; a traveler selection module for selecting travelers wherein a travel itinerary of the respective travelers matches traveler eligibility criteria; an eligibility notification module for notifying, over the network, travelers that the respective travelers are eligible for the travel rewards promotions, the notifications comprising a representation of the travel rewards criteria; a travel rewards compilation module for compiling, a travel rewards promotion total for travelers; and a travel rewards notification module for notifying, over the network, travelers of the respective travelers' promotion rewards travel rewards promotion total.

In one embodiment, the system additionally comprises: a context determination module for determining traveler's current context; a context matching module for matching travelers' current context to promotion alert criteria; and a promotion alert module for alerting, over the network, travelers that travel rewards promotions are available to the respective traveler in the respective traveler's current context, the alerts comprising a representation of travel rewards criteria.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Various embodiments of the current system and method provide improved tools with faster response and flexible controls for offering, tracking and promoting loyalty rewards. For example, rather than doing a promotion for a certain category of merchandise, a company could target individuals who plan to travel, charging travel tickets and other travel goods and services on his credit card. The company already knows that the trip is planned, because travel reservations have been made and charged to the credit card. The company can notify the cardholder of a promotion keyed to his known travel plans. For example, the company could offer double points on any transaction during the trip, in the region of the cardholder's planned travel. Transactions could be tracked by using terminal location data (where the card is swiped) that is passed in the data from the merchant back to the card issuer. In particular, this approach is useful for reward trips, because it allows the company issuing the reward to recover some of the value of the reward by increasing sales revenue during the rewarded trip.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

Figure 1:
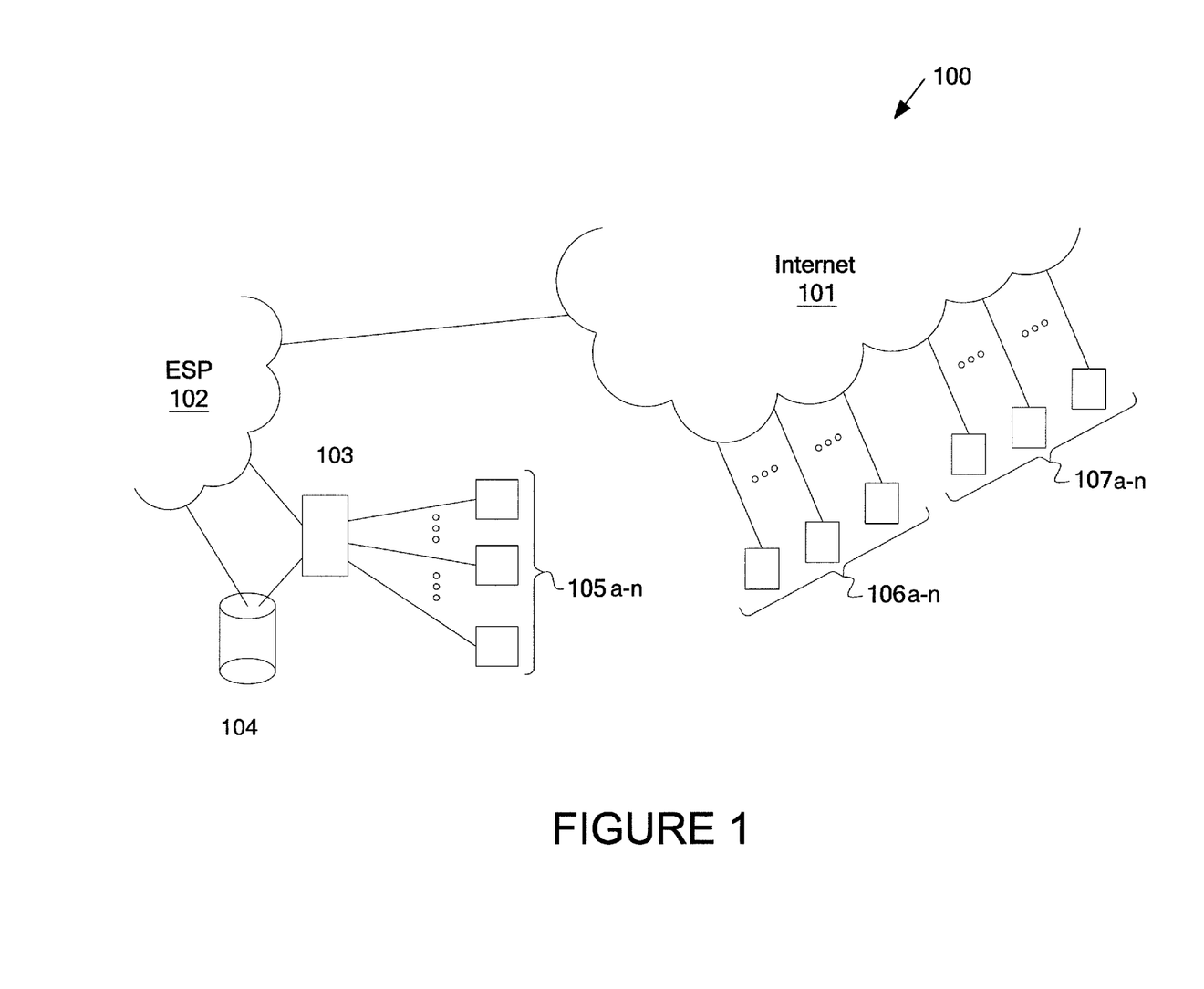
FIG. 1 shows an exemplary system according to one embodiment of the current system and method.

FIG. 1 illustrates one embodiment of a system 100 capable of supporting at various embodiments of processes for offering, tracking and promoting loyalty rewards. An electronic services portal ESP 102 is connected connect to at least one server 103 and at least one data repository 104. The server can host software instances, each comprising one or more modules, 105a-n implementing various embodiments of methods presented below, plus basic elements of the overall system, such as the operating system, as well as any other inherently needed or present software, which, depending on the implementation of the system, may be one, several, or many instances. These software are purely exemplary, and various other configurations are possible, as will be readily apparent to those skilled in the art. In one embodiment, the system 102 connects via Internet 101 to system users 106a-n and suppliers 107a-n. These connections could also be through direct connection, through a phone system, or through any other suitable networking method, known or to be invented. In one embodiment, the system is further capable of connecting to Personal Information Managers (PIMs, not shown) for the purpose of delivering various types of content to the PIMs.

Figure 2:
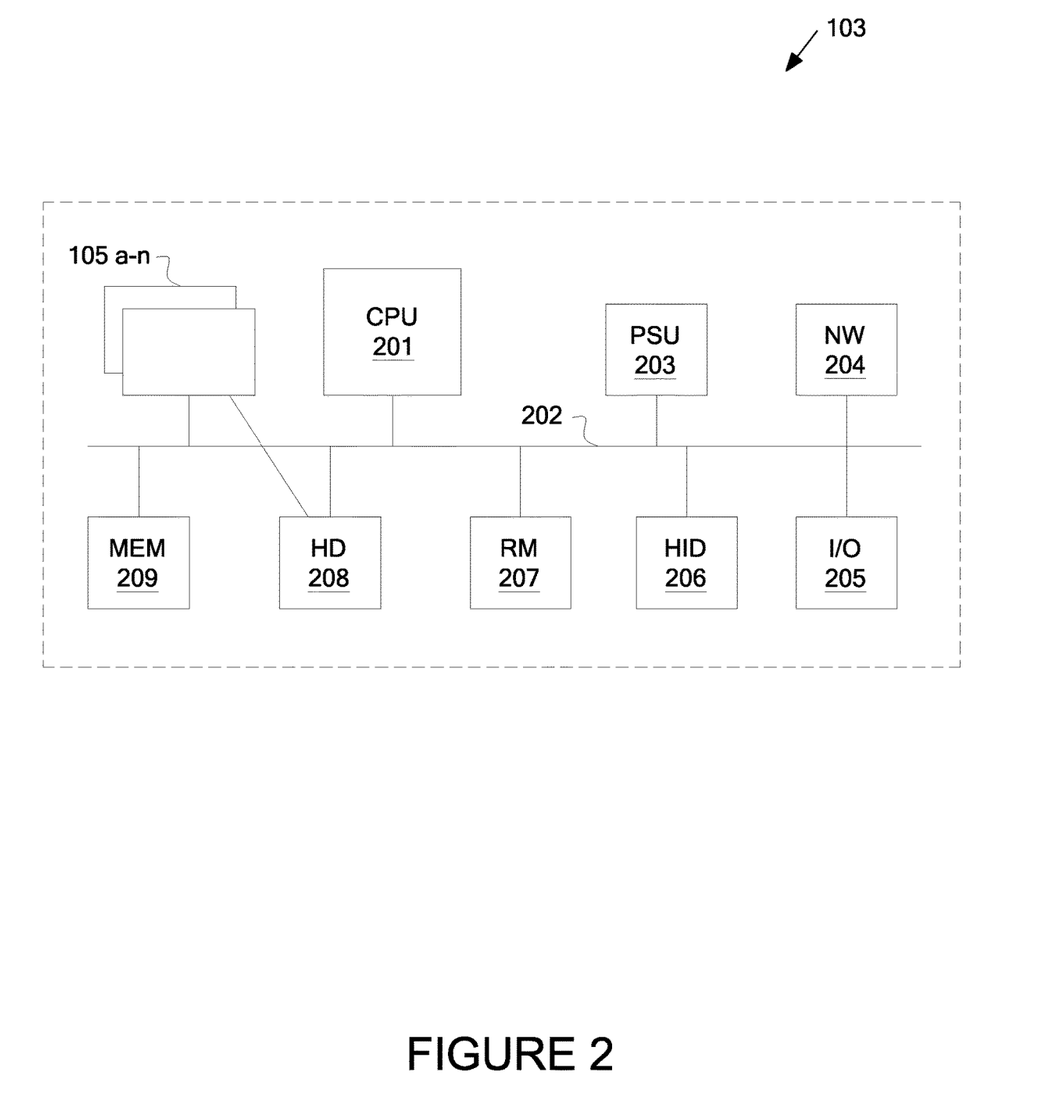
FIG. 2 shows a simplified architectural diagram of an exemplary computer such as server.

In one embodiment, the electronic services portal ESP 102 provides travel-planning services. Such travel planning services could provide facilities to plan and coordinate travel itineraries for a large number of users. Such travel itineraries could include reservations for common carriers (e.g. airline reservations), ground transportation, accommodations, various rental services (e.g. car rental services), and dining. The system could further include profile information for users, including demographic information, travel preferences, relationships to other users and credit card, banking and other types of financial information. The electronic services portal ESP 102 could further be aware of the user's current context and predicted future contexts. A users context could include the user's geographical location (determined via GPS or implied from travel the data and time and the user's itinerary), and the presence or collocation of other users, various services (restaurants) within a given proximity (e.g. 0.1 miles). The electronic services portal ESP 102 may further be aware of the user's historical travel itineraries. The services provided by the electronic services portal ESP 102 could also include promotion creation and tracking services for tracking and promoting loyalty rewards programs as described in greater detail below FIG. 2 shows a simplified architectural diagram of an exemplary computer such as server 103. Server 103 contains a CPU 201; a system bus 202; power supply unit 203; network interface 204; input/output (I/O) unit 205; a human interface device 206, which may or may not be present; removable media drive 207, which may be used to load software into the computer; hard drive 208, on which the software may be installed; and memory 209, which may include both RAM and nonvolatile memory for software such as a basic input output system (BIOS) and other system software, such as an operating system, for example MICROSOFT WINDOWS, LINUX, or any other, similar suitable software. In a networked environment, many of these elements could be moved to one or more other computer(s) and could communicate over a network (as connected to by network interface 204, for example, typically an Ethernet or similar type of network) with system 103. All these elements can be used operate a computer and to run the software instances 105a-n, which can be installed on the hard drive, even if said hard drive is not a local hard drive.

Figure 3:
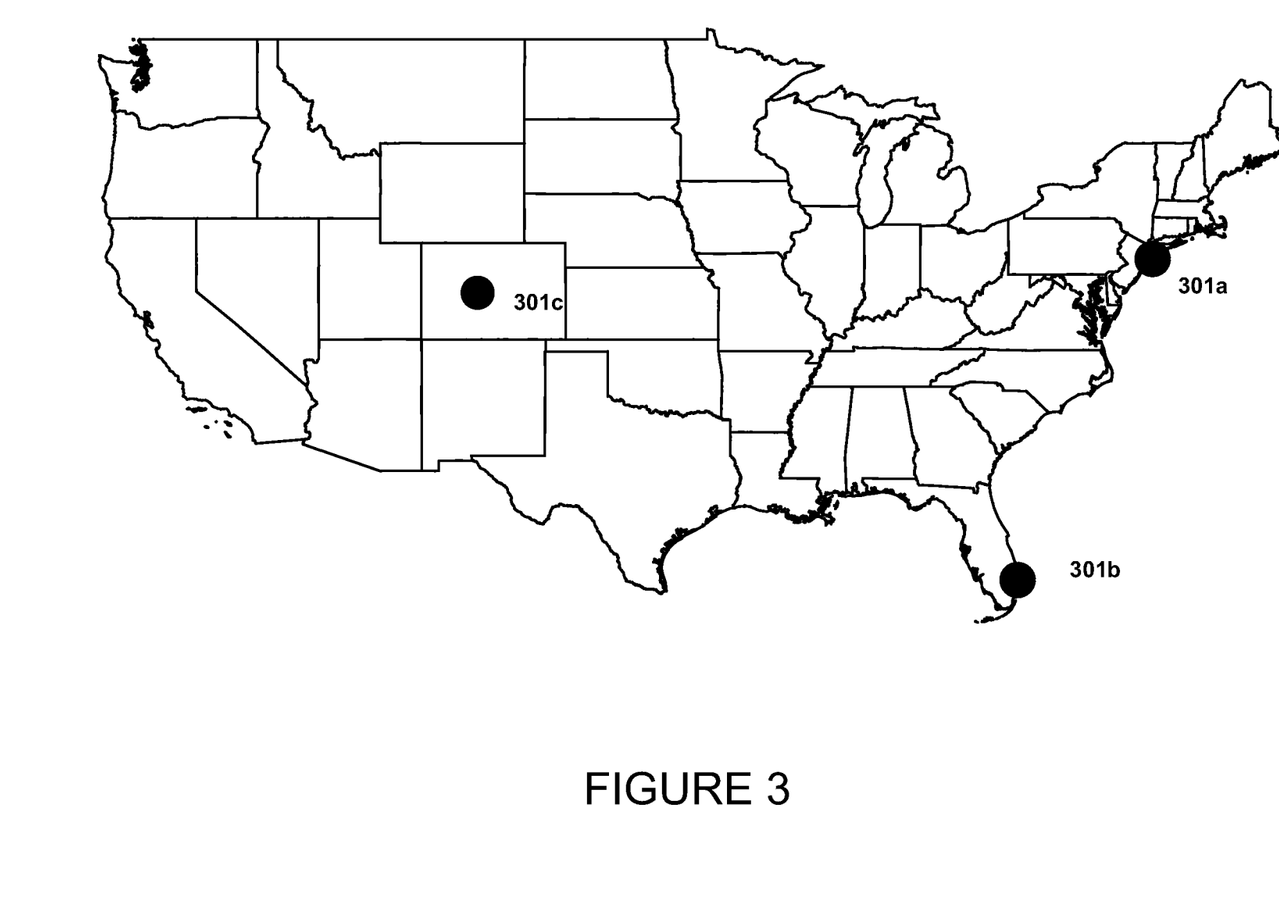
FIG. 3 shows an overview of a map that illustrates an exemplary reward trip where three cities have been chosen.

FIG. 3 shows an overview of a map 300 that illustrates an exemplary reward trip, where three cities have been chosen: New York, 301a, Miami, 301b, and Denver 301c. The locations together comprise a travel pattern for an individual traveler. A card issuer could target a specific reward traveler based on this specific travel itinerary, rather than on a country-wide promotion. For example, the reward trip may have been paid with points of a card-specific loyalty program. By enticing the card holder to maximize his use of the same card during the trip, additional revenue can be secured by encouraging to continue to use the same card.

In other cases, however, some local government or private agency, such as a Chamber of Commerce, for example, may sponsor a promotion to attract travelers to their own region, to a certain event or attraction, etc., so the promotion may not be limited to a specific reward traveler, but may extend to all card-holding travelers eligible for one or more rewards programs. Thus a credit card company could reward users with bonus points, such as, for example, double points on all transactions, during the time period of their trip. For example, if a user books a trip to New York for Christmas, all purchases made between the time of the outbound and the return flight would be eligible.

In some cases, narrow or broader promotion definitions may apply. A user may be informed via a map, or interactively via GPS, as discussed further below, as to what situation may apply. For example, if a user is in New York City, his bonus could extend to Queens, Long Island, or even Newark Airport. Depending on the bank, and on the accuracy of GPS and other system components, different rules might apply, but the user could find out ahead of time. In some cases, promotions might apply to a state or collection of states far enough away from the user's home address to provide a simple solution to make a determination of applicability of bonuses. Also, in some cases, certain types of merchandise may be excluded (i.e., furniture, computers, etc.) based on published rules. In yet other cases, all purchases made between the time of user's outbound and return flight would be eligible.

Figure 4:
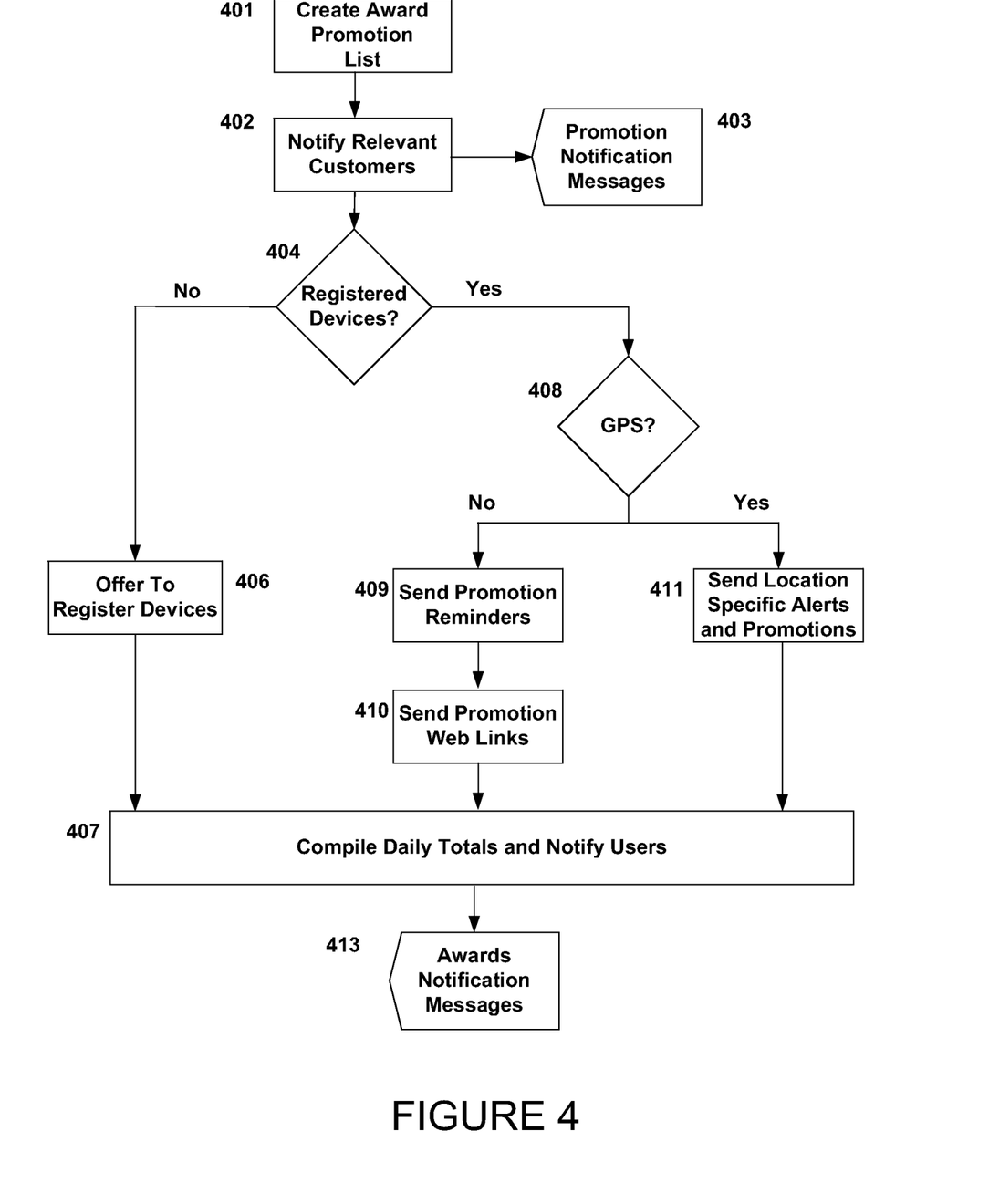
FIG. 4 illustrates one embodiment of a process for offering, tracking and promoting loyalty rewards, including geographic focus.

FIG. 4 illustrates one embodiment of a process for offering, tracking and promoting loyalty rewards. In step 401, the system compiles a list of travel destinations or other targets for reward promotions. In step 402, the relevant customers are notified. In one embodiment, travelers are selected based on promotion targeting criteria, which could include specific travel itineraries, user profile information, current user context and/or a user's predicted future context, or the collocation of related users. A travel itinerary could comprise a pattern of destinations, or could additional include more detailed aspects of a travel plan, such as hotel reservations, ground transportation reservations or reservations.

Relevant profile information for a user could comprise demographic information for the user, specific credit cards used and/or preferred by the user, and specific rewards programs a user is enrolled in. Targeting criteria could additionally comprise specific types of purchases made by users, such as, for example, purchases made with rewards points, purchases made by users using a specific credit card, and/or purchases made using one or credit cards that qualify for a specific rewards. Targeting criteria could specify that at least a portion of the itinerary was booked using a particular credit card or using some or all of the reward points available on such a credit card. Targeting criteria could specify that the timing of providing the promotion is based on travelers travel itinerary. More than one customer may participate in the promotion. For example, if a couple travels on the reward miles of one, but the other has a credit card by the same issuer, both of them may be notified, even though mileage from only one of them is used.

In step 403, emails or some other type of messages are sent, according to each customer's preferences (which may be stored in a user profile). Messages may be sent as call messages, text messages, IMs, emails, web site postings, and other types of messages that may be well known at present or in the future. In step 404 the system checks to determine whether the user has registered devices for receiving real-time or near real-time communication. If the system determines that a user has no registered devices (no), the process moves to step 406, where the system offers to register devices for the user, again, using the same methodology for messages.

Then in step 407 daily reward point totals are compiled and sent in step 413 to the user's registered device. In some cases, a user may be notified on a daily basis; in other cases, he may be notified of a total only at the end of a trip. The rewards points totals are determined according to the requirements of reward criteria within specific promotions, which could include, for example, the use of specific credit cards or the purchase of specific products or service, either generally, or in a specific context (e.g. a geographical location with a specific date range).

If the system determines in step 405 that the user has registered device(s) (yes), the process moves to step 408, where it again branches. In the case of a user device that has GPS capabilities (yes) the process branches to step 411. Devices having GPS capabilities should be broadly construed to include devices that can be geographically located by any means now known or later to be developed. For example, a user cell phone could be geo-located by triangulation, nearest cell tower, or an actual GPS device. The user GPS device can have software or hardware element that interfaces with a promotion tracking system using various techniques. There could be, for example an icon, for example, on the GPS device screen indicating to the user that he is in a "hot" zone for a promotion. This indicator icon could, in some cases, run continuously; while in other cases, the user could click on the icon for a fresh update. If the user's geographical location is known, the user's current context can be determined, which may trigger targeted promotions. If the user is, for example, near a specific participating merchant there may be opportunities to allow the merchant to offer additional bonuses as well.

If the user has no GPS device (no) and the user's location cannot be known or otherwise predicted with sufficient accuracy, the system may, alternatively, in step 409 send reminders to the user about promotions the user has been selected for. In step 410, messages with web links could be offered allowing the user to access an interactive map, showing the area of the promotion. Then the process moves to step 407, described above. Throughout this process, data may be retrieved from or saved to data repository (DR) 104 as needed (not shown).

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:
receiving, over a network, data to define a travel rewards promotion comprising traveler eligibility criteria, travel promotion alert criteria, and travel rewards criteria;
determining, using at least one computing device, a current context of at least one traveler, the current context determined by retrieving a GPS position of the at least one traveler recorded by a mobile device of the at least one traveler;
selecting, using the at least one computing device, the at least one traveler if a travel itinerary of the at least one traveler matches the traveler eligibility criteria, wherein the travel itinerary comprises a pattern of a plurality of destinations, wherein the selection of the at least one traveler is based at least partially on determining that the at least one traveler is currently traveling within a given proximity to a predefined promotion hot zone based on the GPS position associated with the current context of the at least one traveler;
matching, using the at least one computing device, the traveler's current context to the promotion alert criteria;
in response to matching the traveler's current context to the promotion alert criteria: notifying, on a real-time basis, over the network, the at least one traveler that the respective traveler is eligible for the travel rewards promotion associated with the promotion hot zone, the notification comprising a representation of the travel rewards criteria;
if the at least one traveler's current context cannot be determined, sending at least one reminder message, over the network, to the at least one traveler, the reminder message comprising a representation of the travel rewards criteria;
compiling, using the at least one computing device, a travel rewards promotion total for the at least one traveler; and
notifying, over the network, the at least one traveler of the respective traveler's promotion rewards travel rewards promotion total.

2. The method of claim 1 wherein a location of a promotion provider in the promotion criteria is selected based on the travel itinerary.

3. The method of claim 1 wherein the at least one traveler's current context is determined by geo-locating a device of the respective traveler.

4. The method of claim 1 wherein the at least one traveler's current context is estimated based on the traveler itinerary for the respective traveler.

5. The method of claim 1 wherein the at least one traveler's current context is determined by a location where the respective traveler's credit card was used.

6. The method of claim 1 wherein the traveler eligibility criteria additionally comprise using a credit card to book at least a portion of the travel itinerary.

7. The method of claim 1 wherein the traveler eligibility criteria additionally comprise using reward points accumulated for a credit card to book at least a portion of the travel itinerary.

8. The method of claim 7 wherein the traveler eligibility criteria additionally comprise using all of the reward points accumulated for the credit card to book at least a portion of the travel itinerary.

9. The method of claim 1 wherein the promotion criteria provides that reward points are awarded when the respective traveler purchases a specific type of merchandise.

10. The method of claim 1 wherein the at least one traveler is selected based on at least a portion of a profile for the at least one traveler.

11. The method of claim 10 wherein the at least one traveler is selected based on the traveler's membership in a rewards program.

12. The method of claim 10 wherein the at least one traveler is selected based on the traveler's ownership of a specific credit card.

13. A system comprising:
a processor; and
memory coupled to the processor and storing instructions that, when executed by the processor, cause the system to:
receive, over a network, data to define a travel rewards promotion comprising traveler eligibility criteria, travel promotion alert criteria, and travel rewards criteria;
determine a current context of at least one traveler, the current context determined by retrieving a GPS position of the at least one traveler recorded by a mobile device of the at least one traveler;
select the at least one traveler if a travel itinerary of the at least one traveler matches the traveler eligibility criteria, wherein the travel itinerary comprises a pattern of a plurality of destinations, wherein the selection of the at least one traveler is based at least partially on determining that the at least one traveler is currently traveling within a given proximity to a predefined promotion hot zone based on the GPS position associated with the current context of the at least one traveler;
match, using the at least one computing device, the traveler's current context to the promotion alert criteria;
in response to matching the traveler's current context to the promotion alert criteria: notify, on a real-time basis, over the network, the at least one traveler that the respective traveler is eligible for the travel rewards promotion, the notification comprising a representation of the travel rewards criteria;
if the at least one traveler's current context cannot be determined, send at least one reminder message, over the network, to the at least one traveler, the reminder message comprising a representation of the travel rewards criteria;
compile a travel rewards promotion total for the at least one traveler; and
notify, over the network, the at least one traveler of the respective traveler's promotion rewards travel rewards promotion total.

14. A non-transitory computer-readable medium storing computer readable instructions, which when executed, cause a system to perform:
receiving, over a network, data to define a travel rewards promotion comprising traveler eligibility criteria, travel promotion alert criteria, and travel rewards criteria;
determining a current context of at least one traveler, the current context determined by retrieving a GPS position of the at least one traveler recorded by a mobile device of the at least one traveler;
selecting the at least one traveler if a travel itinerary of the at least one traveler matches the traveler eligibility criteria, wherein the travel itinerary comprises a pattern of a plurality of destinations, wherein the selection of the at least one traveler is based at least partially on determining that the at least one traveler is currently traveling within a given proximity to a predefined promotion hot zone based on the GPS position associated with the current context of the at least one traveler;

matching the traveler's current context to the promotion alert criteria;

in response to matching the traveler's current context to the promotion alert criteria: notifying, on a real-time basis, over a network, the at least one traveler that the respective traveler is eligible for the travel rewards promotion, the notification comprising a representation of the travel rewards criteria;

if the at least one traveler's current context cannot be determined, sending at least one reminder message, over the network, to the at least one traveler, the reminder message comprising a representation of the travel rewards criteria;

compiling a travel rewards promotion total for the at least one traveler; and notifying, over the network, the at least one traveler of the respective traveler's promotion rewards travel rewards promotion total.

15. The method of claim 1 wherein the travel itinerary additionally comprises hotel reservations and ground travel reservations.

16. The method of claim 1 wherein a timing of notifying the at least one traveler that the respective traveler is eligible for the travel rewards promotion is based on the travel itinerary.

* * * * *